(Model.)
W. C. ALLISON & R. M. HUNTER.
COUPLING FOR TUBES.
No. 244,157.    Patented July 12, 1881.
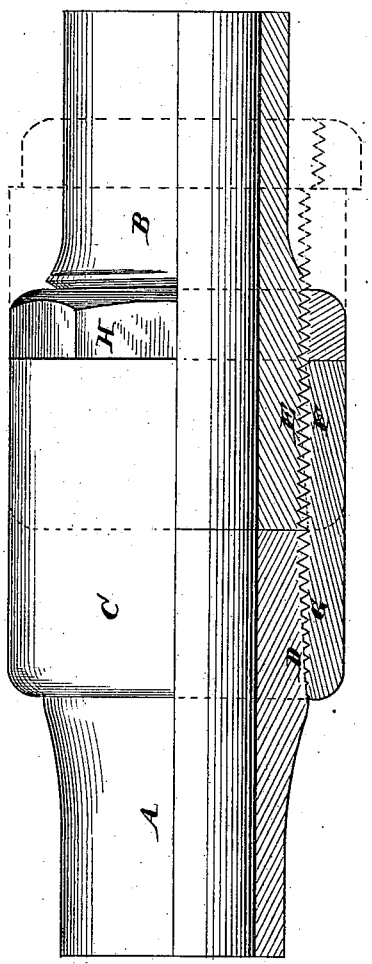
Attests
Inventor
William C. Allison
Rudolph M. Hunter
By their atty

UNITED STATES PATENT OFFICE.

WILLIAM C. ALLISON AND RUDOLPH M. HUNTER, OF PHILADELPHIA, PA.

COUPLING FOR TUBES.

SPECIFICATION forming part of Letters Patent No. 244,157, dated July 12, 1881.

Application filed March 11, 1881. (Model.)

*To all whom it may concern:*

Be it known that we, WILLIAM C. ALLISON and RUDOLPH M. HUNTER, both of the city and county of Philadelphia, and State of Pennsylvania, have invented an Improvement in Couplings for Tubes, of which the following is a specification.

Our invention has reference to couplings for tubes; and it consists in upsetting the end of one tube and cutting thereon a vanishing screw-thread, and in upsetting the end of the other tube and cutting thereon a horizontal screw-thread, and coupling the ends together by a socket internally screw-threaded, one-half of which is a horizontal screw-thread and the remaining half furnished with a vanishing screw-thread, said coupling being adapted to be screwed back upon one tube, leaving the end of the other free and uninclosed, and, further, in the combination of such a coupling as above set forth with a lock-nut, all of which is more fully set forth in the following specification, shown in the accompanying drawing, and referred to in the appended claims.

The object of this invention is to couple two or more tubes or pipes in such a manner that any section may be removed without displacement of those remaining, and at the same time produce a stronger and a tighter joint with less work than was heretofore attained with this class of couplings.

The drawing shows a coupling, one-half in section, embodying in it our invention.

A is the upset end of one tube, and is provided with a vanishing screw-thread, D. B is the upset end of another tube, and is provided with a horizontal screw-thread, E, the length of said thread being somewhat greater than the vanishing screw-thread D. The threads D and E are preferably equal to or less than the upsetting in depth. The nut H being screwed on the end B, the coupling C, provided on one half with internal screw-threads G, corresponding to horizontal screw-threads E, and on the other half with vanishing screw-threads F, corresponding to vanishing screw-threads D, is screwed upon the end B until the end provided with threads F is even with the end of the tube. The next adjacent tube is now placed in position, the end A of which is provided with the vanishing screw-threads. The coupling C is now screwed back upon the end A until the joint D F is perfectly tight. The lock-nut H is now screwed back and locks the coupling in place, and at the same time makes the joint E G perfectly liquid-tight.

By this construction of coupling the joint made by the vanishing screw-threads is perfectly tight, thus leaving only one horizontal thread-joint to make tight, which may be done either by the lock-nut alone, red lead, or its equivalent, or both combined. In couplings in which the ends of both pipes or tubes have horizontal screw-threads, the coupling has two joints to make tight.

To remove any section, the lock-nut H is screwed onto the pipe and away from the sockets C, then the socket is screwed onto the end of pipe B until the end is flush with the end of the tube, when the pipe provided with the vanishing screw-threaded end may be removed without displacement to the tube holding the socket or those remaining.

Having now described our invention, what we claim as new, and desire to secure by Letters Patent, is—

1. A coupling for tubes, consisting of a tube provided with an upset end and having a vanishing screw-thread cut thereon, in combination with another tube provided with an upset end and having a horizontal screw-thread cut thereon, and a socket internally screw-threaded with one-half horizontal screw-threads and the other half vanishing screw-threads, substantially as and for the purpose specified.

2. A coupling for tubes, consisting of a tube, A, the end of which is upset and provided with a vanishing screw-thread, D, and a tube, B, the end of which is upset and provided with a horizontal screw-thread, E, in combination with a socket, C, provided with an internal screw-thread, one half of which, F, is vanishing and the other half, G, horizontal, and a lock-nut, H, provided with an internal horizontal screw-thread and adapted to be screwed upon the screw-threads E on end of tube B, substantially as and for the purpose specified.

In testimony of which invention we hereunto set our hands.

WILLIAM C. ALLISON.
RUDOLPH M. HUNTER.

Witnesses:
CHARLES F. ZIEGLER,
R. A. CAVIN.